United States Patent [19]

Belshaw et al.

[11] Patent Number: 5,100,685
[45] Date of Patent: Mar. 31, 1992

[54] APPARATUS AND METHOD FOR FORMING LIGHTWEIGHT EDIBLE PRODUCTS

[75] Inventors: Thomas E. Belshaw, Seattle; John P. McCarthy, Vashon Island, both of Wash.

[73] Assignee: Belshaw Bros., Inc., Seattle, Wash.

[21] Appl. No.: 696,210

[22] Filed: May 6, 1991

[51] Int. Cl.⁵ .................... A21C 11/00; A23P 1/00
[52] U.S. Cl. ........................... 426/439; 99/354; 425/133.1; 425/287; 425/288; 426/514; 426/516
[58] Field of Search .......... 426/439, 514, 516; 99/354, 407; 425/132, 133.1, 287, 288

[56] References Cited

U.S. PATENT DOCUMENTS 3,504,619 4/1970 Fester et al. ................. 99/354
4,346,649 8/1982 Wilke et al. ................. 99/337

FOREIGN PATENT DOCUMENTS 0273760 7/1988 European Pat. Off. ........... 99/354

Primary Examiner—George Yeung
Attorney, Agent, or Firm—Seed and Berry

[57] ABSTRACT

A doughnut making machine and apparatus has a hopper for the dough of a type which exudes gluten or other sticky substances when compressed, the hopper terminates in a lower cylinder which co-acts with the cutting surfaces on a lower cutting piston. An extruding piston pushes the dough out between the cutting edge of the cylinder and the cutting piston and, thereafter, with retraction of the cutting piston, the dough is severed into a conventional toroidal shape. Edible release oil is distributed onto the cutting edges of the piston and the cutting edge of the cylinder by various distribution techniques. The method by which doughnuts are extruded in a generally toroidal shape while distributing a film of edible release oil onto the dough cutting surfaces and then severing the formed toroidal shaped doughnut from the cutting surfaces whereby the doughnut contacts the release oil on the dough cutting surface and freely releases from the cylinder's cutting edge.

7 Claims, 4 Drawing Sheets

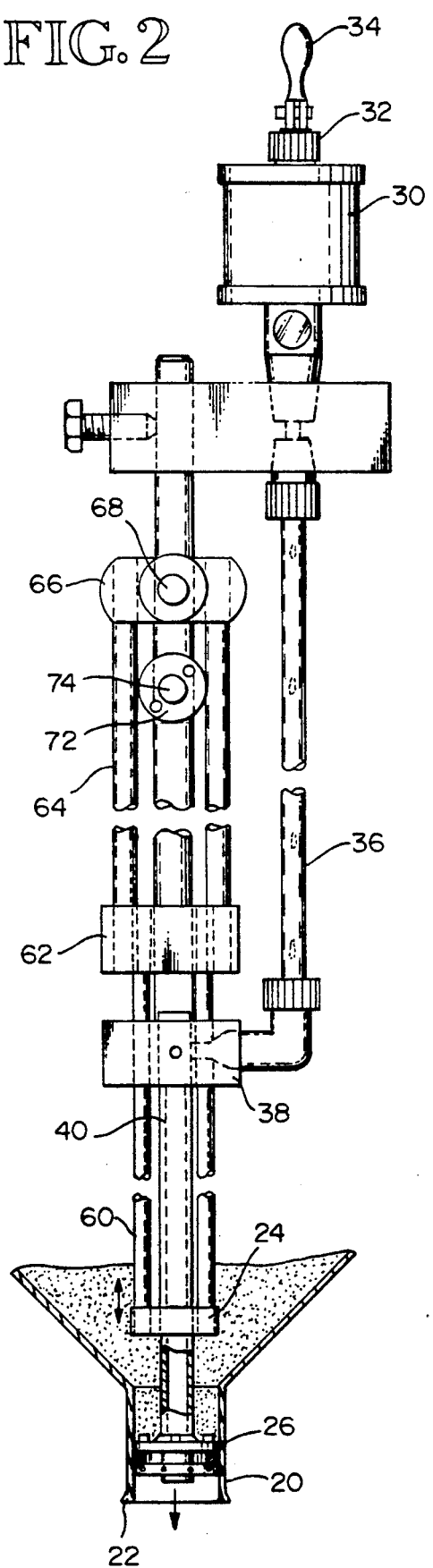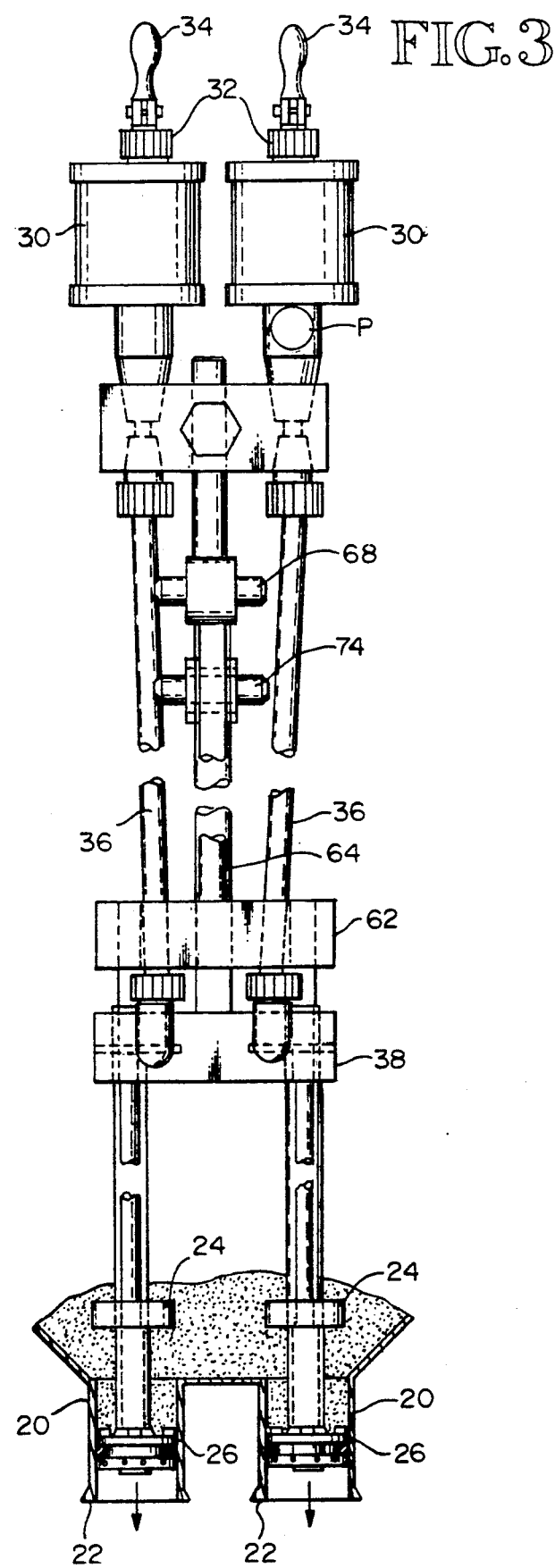

APPARATUS AND METHOD FOR FORMING LIGHTWEIGHT EDIBLE PRODUCTS

DESCRIPTION

1. Technical Field

This invention pertains to edible product frying machines, and particularly to doughnut frying machines of the type in which a doughnut is formed and dropped into a frying tank.

2. Background of the Invention

Doughnut frying machines are known. Typical examples are shown in U.S. Pat. Nos. 3,945,785 and 4,346,649. In these types of doughnut frying machines or fryers, the dough is stored in a hopper and extruded out through a cylinder or cylinders forming a cutter in the bottom of the hopper by reciprocating piston mechanisms. An upper piston pushes the dough into and out of the cylinder, whereas a lower piston on operation creates a partial vacuum to allow the air pressure to move the dough into the cylinder. The lower piston also can be retracted to serve as a cutter to cut the extruded dough from the dough remaining in the cylinder by engaging the lower piston against the bottom cutting edge of the cylinder. The doughnut that forms is the typical toroidal shape and falls by gravity into a frying tank, between the flights of a moving conveyor, or into an open kettle.

As long as the doughnuts or other edible product are reasonably large in size, the weight of the product is sufficient to produce a clean and quick separation from the cutting edge of the hopper cylinder. During the extrusion of the dough, particularly non-yeast dough as is used in making doughnuts, components of the dough, such as gluten or other sticky substances, will build up and form a film on the cutting edge of the cylinder and the cutting piston. With heavier doughnuts, the weight of the doughnut is sufficient to still provide a reasonably clean and quick separation from the cutting edge of the cylinder. With lighter weight doughnuts, such as mini-doughnuts, which are frequently formed in multiple cylinders in a single hopper, the gluten attached to the cutting surfaces adheres to the extruded formed doughnut dough, leaving strings of dough attached to the cutting surfaces when the doughnut finally falls free. More importantly, however, the adhesion of the dough to the gluten-coated cutting surfaces occasionally causes the doughnut to adhere and fall only after a nonuniform time delay such that, when the doughnut does fall, it will not fall between the flights on the conveyor but may land on a conveyor flight, damaging the product and causing the need for more frequent cleaning of the equipment. Also, if the doughnut sticks at one end it can topple onto its edge while falling into the cooking oil and be distorted in shape.

SUMMARY OF THE INVENTION

It is an object of the invention to provide an improved doughnut forming mechanism for making doughnuts that fall from the cutting cylinder into a frying tank.

It is another object of the invention to provide a method and apparatus for distributing edible release oil onto the cutting surfaces of a doughnut extruding mechanism to inhibit the buildup of sticky substances and so give a clean and quick release of the product.

Basically, the apparatus invention is achieved by providing at least one doughnut extruding cylinder having a lower open end terminating in a cutting edge, reciprocating a lower cutting piston in the cylinder, reciprocating an upper extruding piston in the cylinder, forming the edible dough product by extruding a small amount of the dough between the upper and lower pistons out of the open end of the cylinder and then retracting the lower piston to cut the shaped doughnut from the dough remaining in the cylinder, and providing an edible oil release distribution system to the surfaces of the cutting edge of the lower open end of the cylinder, the inside surface of the cylinder, and the lower cutting piston to inhibit the buildup of gluten or other sticky substances on these surfaces and assuring a clean release and free-fall of the formed product by gravity into the frying tank.

Various embodiments are provided for the distribution of the edible release oil to the cutting surfaces, including distribution ports in the cutting piston, distribution ports between the bottom of the cutting piston and an oil distribution disc, and spraying oil onto the external surface of the lower end of the cylinder as typical examples.

The method of the invention includes forming lightweight doughnuts and separating the formed doughnuts from the supply of dough cleanly for free-falling into a doughnut frying tank having a doughnut moving conveyor therein, comprising the steps of extruding the supply of dough containing gluten or other sticky substances that are exuded when the dough is extruded into a toroidal shape past a cylindrical dough cutting surface located above a doughnut frying tank, distributing a film of edible release oil on the dough cutting surface, severing the formed toroidal shaped dough into a doughnut by passing a cutting piston past and into engagement with said cutting surface, whereby the doughnut contacts the release oil on the dough cutting surface and freely releases from the cutting surface to fall in timed relationship to movement of the conveyor in the frying tank.

As is apparent from the invention, the method and apparatus produce doughnuts which fall freely into the frying tank for reducing damaged products and which can enable increased production rates so that the large, rapid production of doughnuts can fall freely between the flights of the conveyor.

BRIEF DESCRIPTION OF THE DRAWINGS

FIG. 2 is a fragmentary front elevation of a portion of the doughnut making apparatus shown in FIG. 1.

FIG. 3 is a fragmentary side elevation of a portion of the doughnut making apparatus shown in FIG. 1.

DETAILED DESCRIPTION OF THE INVENTION

Figure 1:
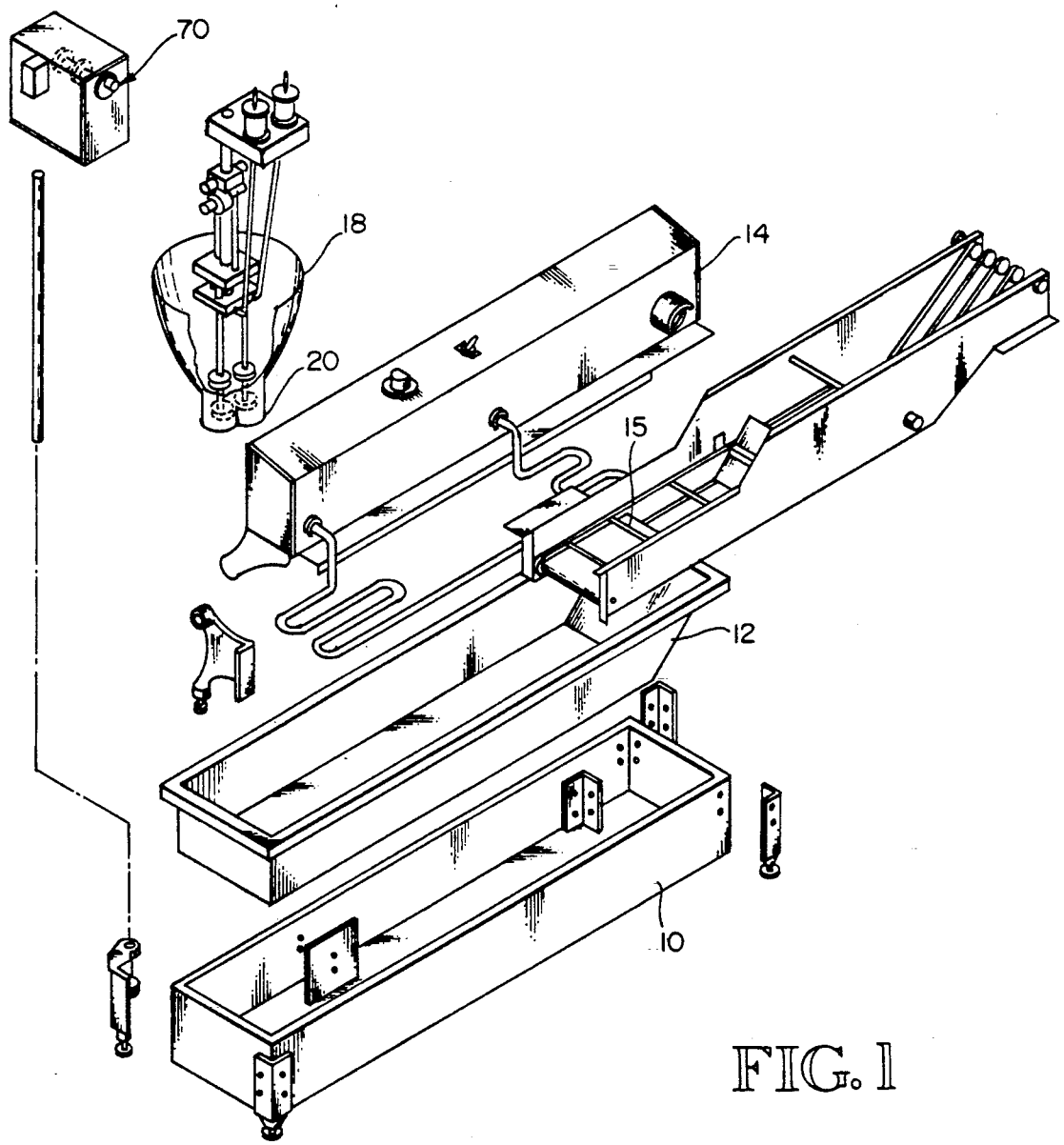
FIG. 1 is an exploded isometric showing a typical doughnut making apparatus.

FIG. 1 shows a typical doughnut making apparatus of the type shown in U.S. Pat. No. 4,346,649. In addition, U.S. Pat. No. 3,945,785 shows details of forming doughnuts in a cylindrical-type dough extruder of the type used to make toroidal shaped doughnuts. The details of these patents are incorporated herein by reference thereto.

A typical doughnut forming apparatus will include a base 10 holding a frying tank 12 which holds a level of hot cooking oil heated by a heater 14. Doughnuts are dropped into the tank and are moved through the tank by the flights 15 of a conveyor. The doughnuts are timed to be formed and to drop between the flights so that they land directly in the cooking oil.

The dough is deposited in a hopper 18 having one or more cylinders 20 terminating in a lower open end having a cutting edge 22. The dough is extruded out of the cylinder by an upper extruding piston 24. The downward stroke of the extruding piston is timed to co-act with a lower cutting piston 26 so that dough is extruded out the bottom of the open end of the cylinder between the extruding and cutting pistons. Thereafter, the cutting piston is retracted so that the upper surface of the cutting piston sweeps past the cutting edge 22 of the cylinder to sever the extruded dough from the dough remaining in the cylinder. This forms the common toroidal shaped doughnut which then falls into the cooking oil between the flights of the conveyor.

The dough used in the making of doughnuts exudes gluten or other sticky substances when compressed in the cylinder. It is an important aspect of this invention to provide a distribution of edible release oil to the cylinder wall and cutting surfaces so that the gluten does not attach to the cylinder wall and the cutting surfaces, leaving the surfaces clean and with a light coating of oil for free release of the formed doughnuts. The apparatus as best shown in FIGS. 2 and 3 is provided with tanks of edible oil 30, the discharge of oil from which is controlled by a conventional flow control valve 32 operated by a valve control actuating mechanism 34. The oil can be allowed to flow by gravity in minute quantities sufficient to maintain a coating on the cutting surfaces. In the alternative, the oil distribution can be achieved by the use of a small, conventional pulsing pump P (FIG. 3) to produce timed, pressurized pulses of the oil into the distribution system.

Figure 4:
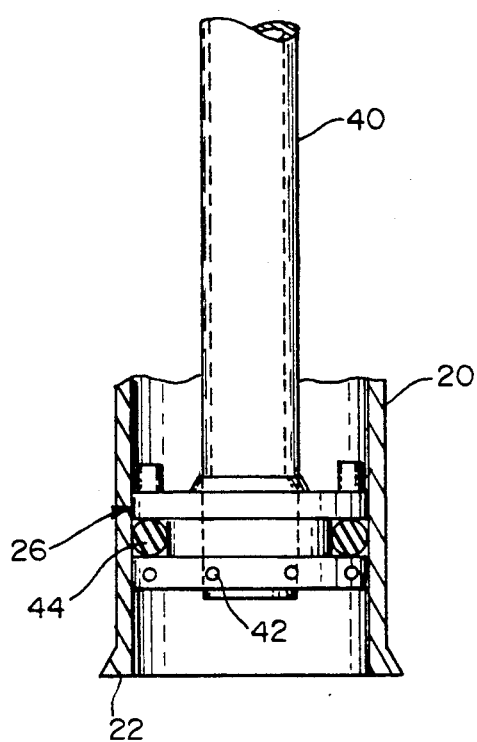
FIG. 4 is an enlarged detail showing a first embodiment of the invention illustrated in FIGS. 1-3.

The oil travels from the pump or by gravity through oil lines 36 and through a manifold 38 into a hollow piston rod 40 connected to the lower cutting piston 26. As best shown in FIG. 4, the oil passes through the piston and is distributed through a plurality of circumferentially uniformly spaced ports 42 in the lower end of the piston. An o-ring seal 44 prevents the extrusion of the dough beyond the piston when the lower piston is retracted into the cylinder 20.

Figure 5:
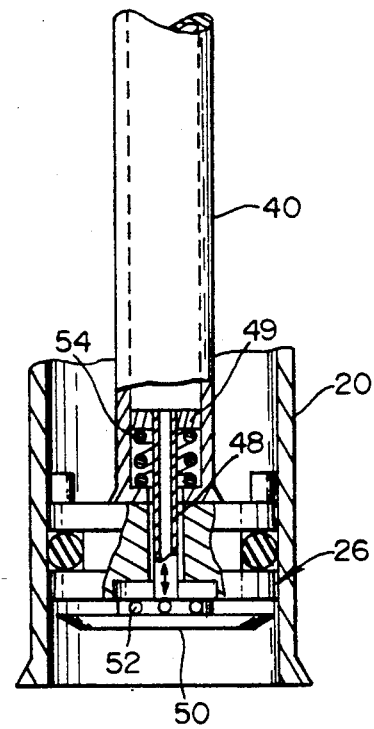
FIG. 5 is an enlarged detail showing a second embodiment of the invention.

FIG. 5 shows an alternative distribution system in which the oil in the hollow piston tube 40 passes through a hollow rod 48 that is threaded into a cylindrical guide disc 49. The lower end of the threaded rod is secured to a valve disc 50 that receives oil through passages 52 onto the upper surface of the valve disc. A coil spring 54 maintains the disc closed against the underside of the cutting piston 26 until a slight pulse of oil from the pump P forces the oil through the hollow threaded rod out the passages 52 and onto the surfaces of the lower end of the cutting piston and the upper surface of the valve disc. In both embodiments of FIGS. 4 and 5, the oil migrates by capillary action to the perimeter of the cutting disc and is wiped onto the cutting edge of the cylinder 20 as the cutting piston is reciprocated in and out of the cylinder 20.

Figure 6:
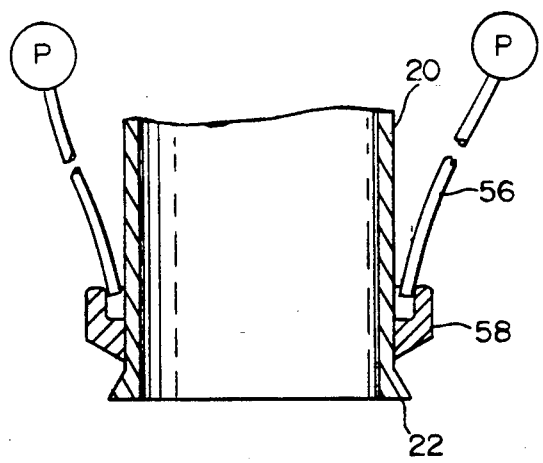
FIG. 6 is an enlarged fragmentary detail showing a third embodiment of the invention.

FIG. 6 shows an alternative embodiment in which oil from pump P is distributed through nozzles 56 to spray into a trough 58 surrounding and attached to the cylinder 20. The trough allows the oil to overflow and flow down and around by gravity and capillary action onto the lower cutting edge 22 of the cylinder.

Reciprocation of the upper piston 24 is controlled by elongated control rods 60 that are fixed to a travelling block 62. Upper control rods 64 are connected to the travelling block 62 and to a driven block 66. Drive pins 68 are driven by a conventional yoke mechanism 70 (FIG. 1) that reciprocates that upper piston in a predetermined time sequence.

The piston rod 40 for the lower cutting piston 26 is reciprocated by a second driven block 72 that is fixed to the piston rod. The block 72 is provided with drive pins 74 that are also driven by the eccentric mechanism 70 shown schematically in FIG. 1.

The details of the piston operating mechanisms are well known so that further description is not necessary for an understanding of the invention.

Figure 7:
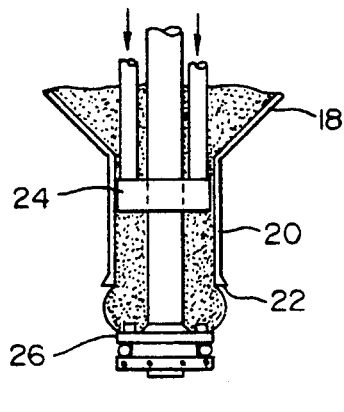
FIG. 7 is a schematic operational view showing the apparatus components beginning to extrude dough.
Figure 8:
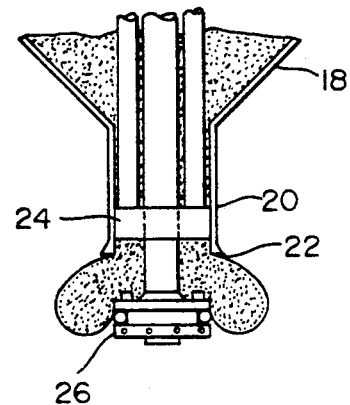
FIG. 8 is an operational schematic showing further extrusion of the dough.
Figure 9:
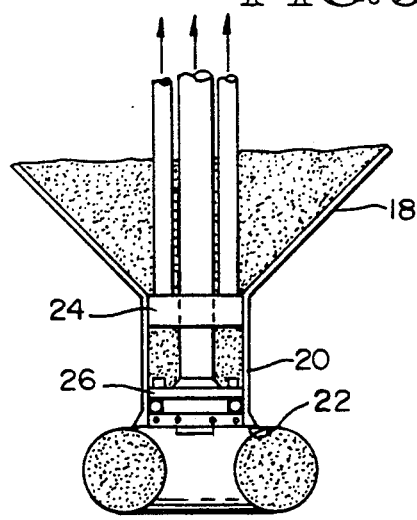
FIG. 9 is an operational schematic showing the toroidal shaped doughnut has been cut from the dough in the cylinder.

The method can best be described by proceeding through the operation of the apparatus illustrated. In operation, the upper and lower pistons are shown in the relaxed position in FIG. 2 in which dough has filled the void between the pistons. In FIG. 7, the upper piston has begun to move down so that dough is now trapped and being extruded out of the lower cylinder. In FIG. 8, the dough is now being extruded out between the cutting edge 22 and the upper surface of the cutting piston 26. In FIG. 9, both pistons are being retracted so that the extruded dough now is cut into its toroidal doughnut shape by the upper surfaces of the cutting piston engaging the cutting edge 22 of the lower open end of the cylinder.

The edible release oil is allowed to flow by gravity or is pulsed by a pump out of the holes 42 or 52 or into the trough 58 and then onto the cutting surfaces. As the lower piston reciprocates upwardly, the oil is drawn onto the cutting edge and coats the surfaces of both the inside of the cylinder and the cutting edge 22. Oil also coats the upper edge of the cutting piston. The coating prevents the buildup of gluten and also provides a slippery surface for free release of the doughnut.

While the preferred embodiments of the invention have been illustrated and described, variations will be apparent to one skilled in the art without departing from the principles described herein. Accordingly, the invention is not to be limited to the specific embodiments illustrated in the drawing.

We claim:

1. Apparatus for forming doughnuts or other edible products using a dough extrusion mechanism for extruding shaped products, the products made from a dough which exudes a gluten or other sticky substance when the dough is compressed, comprising:
   at least one cylinder for forming the dough, and having a lower open end with a cutting edge;
   a lower cutting piston in said cylinder;
   an upper extruding piston on said cylinder;
   means for reciprocating the lower and upper pistons and the cylinder lower end relative to one another for trapping a quantity of dough, extruding the dough out the open end of the cylinder, and cutting the extruded dough from the dough remaining in the cylinder between the cylinder lower end and the lower piston by moving the lower piston and lower end of the cylinder toward and into engagement with one another; and means for distributing a layer of edible release oil around the lower open end of the cylinder to inhibit bonding of the dough or gluten or other sticky substances to the open end of the cylinder so that the dough product falls freely from the cutting edge of the lower open end of the cylinder.

2. The apparatus of claim 1, said lower piston supported on a hollow piston rod, said release oil distributing means including a source of oil connected to said hollow piston rod, valve means for controlling the flow of oil onto the piston rod, and a distribution manifold at said lower piston for guiding the oil radially outwardly toward the cylinder lower open end.

3. The apparatus of claim 2, said lower piston including a seal and a piston flange having an outer peripheral surface below the seal, said distribution manifold including a plurality of uniformly circumferentially spaced ports connected to said hollow piston rod and to the outer peripheral surface of said piston flange.

4. The apparatus of claim 2, said lower piston including a seal and a piston flange having an outer peripheral surface below said seal, said distributor manifold including a distribution disc having an upper distribution boss mounted on said lower piston below said piston flange, a plurality of oil ports distributed around the distribution boss and connected by a central passage to said hollow piston rod for distributing the edible release oil between the distribution disc and the piston flange.

5. The apparatus of claim 1, said distribution means including a trough surrounding said cylinder lower open end, and means for delivering oil to the trough to overflow and flow onto the lower open end of the cylinder.

6. Apparatus for forming lightweight doughnuts, comprising: a hopper of doughnut forming dough of the type exuding gluten or other sticky substance of the dough, said hopper terminating at a lower end with at least one doughnut forming cylinder having a lower cutting edge, a cutting piston relatively reciprocable in said cylinder, means for moving dough through the cylinder against said cutting piston, a supply of edible release oil, a distribution system for carrying the oil from the supply to the lower cutting edge of the cylinder for inhibiting the buildup of the gluten or other sticky substance so that the formed doughnut falls freely from the cylinder lower cutting edge as the edge and cutting piston engage one another, means for moving the piston and cylinder relative to each other to cut the formed doughnut from the dough remaining in the cylinder.

7. A method of forming lightweight doughnuts and separating the formed doughnuts from the supply of dough cleanly for free-fall into a doughnut frying tank having a doughnut moving conveyor therein, comprising:

extruding a supply of dough containing gluten or other sticky substances that are exuded when the dough is extruded in a toroid shape past a cylindrical dough cutting surface located above a doughnut frying tank;

distributing a film of edible release oil on the dough cutting surface;

severing the formed toroidal shaped dough into a doughnut by passing a cutting piston past and into engagement with said cutting surface, whereby the doughnut contacts the release oil on the dough cutting surface and freely releases from the cutting surface to fall in timed relationship to movement of the conveyor in the frying tank.

* * * * *